(12) United States Patent
Gorman

(10) Patent No.: US 7,674,862 B2
(45) Date of Patent: Mar. 9, 2010

(54) PARTIAL SOLVENT STRIPPING PROCESS FOR RECOVERING BROMINATED BUTADIENE POLYMERS FROM SOLUTION

(75) Inventor: David Bruce Gorman, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/257,661

(22) Filed: Oct. 24, 2008

(65) Prior Publication Data

US 2009/0118427 A1  May 7, 2009

Related U.S. Application Data

(60) Provisional application No. 61/002,213, filed on Nov. 7, 2007.

(51) Int. Cl.
*C08C 19/12* (2006.01)
*C08F 8/20* (2006.01)

(52) U.S. Cl. .................................. 525/355; 525/356
(58) Field of Classification Search ................ 525/355, 525/356
See application file for complete search history.

(56) References Cited

U.S. PATENT DOCUMENTS

| | | | |
|---|---|---|---|
| 3,084,142 A * | 4/1963 | Cottle et al. | ................ 525/356 |
| 3,804,145 A | 4/1974 | Arnold | |
| 4,568,418 A | 2/1986 | Walko | |
| 5,317,083 A | 5/1994 | Freitag | |
| 5,475,084 A | 12/1995 | Okamoto | |
| 5,615,831 A | 4/1997 | Molezzi | |

FOREIGN PATENT DOCUMENTS

| | | |
|---|---|---|
| WO | WO2008/021417 | 2/2008 |
| WO | WO 2008/021417 A2 * | 2/2008 |
| WO | WO 2008/021418 | 2/2008 |
| WO | WO 2008/021418 A1 * | 2/2008 |

OTHER PUBLICATIONS

U.S. Appl. No. 12/146,636, filed Jun. 26, 2008, Leng.

* cited by examiner

*Primary Examiner*—Ling-Siu Choi
(74) *Attorney, Agent, or Firm*—Gary C Cohn PLLC

(57) ABSTRACT

Brominated butadiene polymers are recovered from a bromination reaction solution by partially stripping the solvent to form a concentrated solution or slurry, and then recovering the brominated butadiene polymer from the concentrated solution or slurry. The process allows for a simplified, effective an economical recovery of the brominated butadiene polymer. Brominated butadiene polymers recovered in this manner are often very thermally stable.

9 Claims, No Drawings

PARTIAL SOLVENT STRIPPING PROCESS FOR RECOVERING BROMINATED BUTADIENE POLYMERS FROM SOLUTION

This application claims priority from U.S. Provisional Patent Application No. 61/002,213, filed 7 Nov. 2007.

The present invention relates to a process for recovering a brominated butadiene polymer from solution.

Brominated butadiene polymers are candidates for replacing hexabromocyclododecane as a flame retardant (FR) additive in various polymer systems. These brominated polymers are often made by brominating a polybutadiene precursor, which may be a polybutadiene homopolymer but more typically is a block copolymer of butadiene and a vinyl aromatic monomer such as styrene. The bromination reaction is typically conducted in solution. A number of different brominating agents can be used, including elemental bromine and various ammonium tribromide compounds. The brominated polymer then must be recovered from the reaction solution so it can be blended into the polymer system in which it will be used. This is commonly done by adding an organic antisolvent to precipitate the brominated polymer from solution and then filtering, washing and drying the brominated polymer. This technique has the drawbacks of high capital and operating costs, because large volumes of antisolvent must be handled, recovered and recycled. In addition, the polymer is recovered in the form of very low (~0.14 g/mL) bulk density particulates. The low density material has a high volume per unit weight, which increases storage, handling and transportation costs. Another problem is that the reaction mixture often must be quenched with a material such as sodium bisulfite, which increases costs and adds complexity to the product recovery process.

It would be desirable to provide a method by which a brominated butadiene polymer can be recovered from a crude reaction solution efficiently and cost effectively. The method preferably permits the brominated butadiene polymer to be recovered in the form of a particulate solid that preferably is easily filtered and has a bulk density of 0.20 g/mL or more. The method should produce a brominated butadiene polymer with good thermal stability and very low levels of ionic impurities.

The present invention is a process comprising a) brominating a butadiene polymer to form a crude reaction mixture containing a brominated butadiene polymer dissolved or dispersed in a solvent;

b) distilling a portion of the solvent from the crude reaction mixture to form (1) a distillate containing a portion of the solvent and (2) a concentrated solution or slurry of the brominated butadiene polymer in another portion of the solvent, and then c) recovering the brominated butadiene polymer from the concentrated solution or slurry.

The present invention is also a process comprising a) contacting a solution of a butadiene polymer with elemental bromine in the presence of an aliphatic alcohol having a boiling temperature of up to 120° C., under conditions such that a crude reaction mixture containing a brominated butadiene polymer is produced;

b) distilling a portion of the solvent and the aliphatic alcohol from the crude reaction mixture to form (1) a distillate containing a portion of the solvent and at least a portion of the aliphatic alcohol and (2) a concentrated solution or slurry of the brominated butadiene polymer in another portion of the solvent, and then c) recovering the brominated butadiene polymer from the concentrated solution or slurry to form brominated butadiene polymer particles having a bulk density of at least 0.20 g/mL.

This process is a cost-effective, efficient method for recovering the brominated butadiene polymer in a purified form from a crude reaction solution. The solvent often is recoverable from the distillate in a purity such that it can be in most cases directly recycled into the process. The waste stream produced by the process tends to be a small volume stream and so material losses tend to be small.

The process can produce a brominated butadiene polymer having low levels of impurities, and in particular low levels of hydrogen bromide (HBr). Brominated butadiene polymers recovered by the process often have very good thermal stability. The brominated polymers can exhibit 5% weight loss temperatures, determined according to the TGA method described below, of 220° C. or more.

The process provides a direct means for recovering the brominated polymer in the form of a particulate solid. Because of this, subsequent sizing steps such as grinding or cutting the brominated polymer can be reduced or avoided. In most cases, the particles are easily filtered, and so can be easily recovered. The particulate nature of the product facilitates the use of the polymer in downstream operations, as particles are a convenient form for combining the brominated polymer with another polymer to make blends. The recovered particles typically have a bulk density of at least 0.20 g/mL and preferably at least 0.35 g/mL. The bulk density of the recovered particles is often as high as 0.40-0.45 g/mL or more.

The bromination reaction is conducted by contacting a butadiene polymer with a brominating agent in the presence of a solvent for the butadiene polymer. It is especially preferred to conduct the bromination reaction by mixing the elemental bromine with a solution of the butadiene polymer in the presence of an aliphatic alcohol, and allowing the mixture to react until the desired proportion of butadiene units have been brominated.

Generally, only mild conditions are needed to effect the bromination, particularly in the preferred process in which elemental bromine is the brominating agent. Subambient temperatures as low as −80° C. can be used from the point of view of reaction kinetics, although it is difficult to keep the starting copolymer in solution at such low temperatures. Preferred bromination temperatures can range from −40 to 100° C., and are preferably from −20 to 85° C. and especially from −10 to 70° C. Temperatures higher than 100° C. could be used, but are not necessary and may lead to a loss of selectivity and/or an increase in by-products. Generally, an exotherm is seen at the beginning of the reaction, when the bromine is first contacted with the starting copolymer.

The time of the reaction is sufficient to achieve the desired amount of bromination. Typically, the reaction is continued until bromination has occurred on least 25% of the butadiene units in the copolymer. More preferably, at least 80%, more preferably at least 90% and even more preferably at least 95% of the butadiene units are brominated. Up to 100% of the butadiene units can be brominated. Preferably up to 99% or up to 95% of the butadiene units are brominated. The extent of bromination can be determined using proton NMR methods. Residual double bond percentage, polymerized styrene monomer content and 1,2-isomer content can be determined by comparing integrated areas of signals due to appropriate protons. Residual double bond protons are between 4.8 and 6 ppm, styrene aromatic protons are between 6.2-7.6 ppm, and protons for brominated polybutadiene are between 3.0 and 4.8 ppm, all relative to tetramethylsilane. A Varian INOVA™

300 NMR spectrometer or equivalent device is useful for such determinations, being operated with a delay time of 10 seconds to maximize relaxation of protons for quantitative integrations. A deutero-substituted solvent such as deutero-chloroform or d5-pyridine is suitable for diluting the sample for NMR analysis.

The amount of elemental bromine that is used in the preferred process may be as much as 1.5 moles per mole of aliphatic carbon-carbon double bonds contained in the starting polymer. A suitable amount of bromine is from 0.5 to 1.2 moles/mole of aliphatic carbon-carbon double bonds. A preferred amount is from 0.8 to 1.1 moles/mole and a more preferred amount is from 0.95 to 1.05 moles/mole.

In the preferred bromination process, the amount of aliphatic alcohol is selected such that (1) at least 0.5 mole of the alcohol is provided per mole of elemental bromine and (2) the starting butadiene polymer remains soluble in the reaction mixture. Some aliphatic alcohols act as antisolvents for the starting polymer, and so their presence in excessive amounts can cause the starting polymer to precipitate from solution. A preferred amount of the aliphatic alcohol is 0.5-6 moles/mole of elemental bromine, a more preferred amount is 0.75-3.5 moles/mole of elemental bromine, and an even more preferred amount is 1.00-1.05 moles/mole of elemental bromine. Quantities above these amounts can be used provided that the starting polymer remains soluble.

The starting polymer is a homopolymer or copolymer of butadiene. A copolymer suitably contains at least 10% by weight of polymerized butadiene. A preferred type of butadiene polymer is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

Butadiene polymerizes to form two types of repeating units. One type, referred to herein as "1,2-butadiene units" takes the form

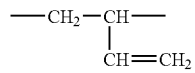

and so introduces pendant unsaturated groups to the polymer. The second type, referred to herein as "1,4-butadiene" units, takes the form —CH$_2$—CH═CH—CH$_2$—, introducing unsaturation into the main polymer chain. The butadiene polymer preferably contains at least some 1,2-butadiene units prior to bromination. Of the butadiene units in the butadiene polymer prior to bromination, at least 10%, preferably at least 15% and more preferably at least 20% and even more preferably at least 25%. are 1,2-butadiene units. 1,2-butadiene units may constitute at least 50%, at least 55%, at least 60% or at least 70% of the butadiene units in the polymer prior to bromination. The proportion of 1,2-butadiene units may be in excess of 85% or even in excess of 90% of the butadiene units in the polymer before bromination.

Styrene/butadiene block copolymers are especially preferred starting materials. These copolymers are widely available in commercial quantities. Those available from Dexco Polymers under the trade designation VECTOR™ are suitable.

The butadiene polymer may also contain repeating units formed by polymerizing monomers other than butadiene and a vinyl aromatic monomer. Such other monomers include olefins such as ethylene and propylene, acrylic or acrylate monomers such as methyl methacrylate, methyl acrylate, acrylic acid, and the like. These monomers may be randomly polymerized with the vinyl aromatic monomer and/or butadiene, may be polymerized to form blocks, or may be grafted onto the butadiene polymer.

The butadiene polymer may have, prior to bromination, a weight average molecular weight ($M_w$) within a range of from 1,000 to 200,000, preferably from 2,000 to 60,000, more preferably from 5,000 to 60,000 and even more preferably, at least from a commercial availability point of view, from 20,000 to 60,000. For purposes of this invention, molecular weights are apparent molecular weights as measured by gel permeation chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector (or equivalent device), with tetrahydrofuran (THF) flowing at a rate of 1 mL/min and heated to a temperature of 35° C. as the eluent.

The most preferred type of butadiene polymer is a block copolymer containing one or more polystyrene blocks and one or more polybutadiene blocks. Among these, block copolymers having a central polybutadiene block and terminal polystyrene blocks are especially preferred.

Suitable solvents for the bromination include ethers such as tetrahydrofuran; halogenated alkanes such as carbon tetrachloride, chloroform, dichloromethane, bromochloromethane and 1,2-dichloroethane; hydrocarbons such as cyclohexane, cyclopentane, cyclooctane and toluene, and halogenated aromatic compounds such as bromobenzene, chlorobenzene and dichlorobenzene. Preferred solvents have boiling temperatures (at atmospheric pressure) of less than 100° C. (especially less than 80° C.), are substantially immiscible in water, are aprotic, and do not contain either hydrogen atoms bonded to a tertiary carbon atom or oxygen. Halogenated alkanes, cyclic alkanes that contain no hydrogen atoms bonded to a tertiary carbon atom and halogenated aromatic compounds are particularly preferred solvents. Among the especially preferred solvents are 1,2-dichloroethane, chlorobenzene, methylene chloride and cyclohexane.

The solvent is used in quantities sufficient to dissolve the butadiene polymer under the conditions of the reaction. The concentration of the butadiene polymer in the solvent during the bromination reaction may range from, for example, 1 to 50% by weight, especially from 5 to 35% by weight. In some cases, the maximum concentration of the butadiene polymer in the solvent during the bromination reaction may be limited by the solubility of the starting polymer under the conditions of the reaction.

Suitable aliphatic alcohols that are useful in the preferred process include methanol, ethanol, isopropanol, n-propanol, t-butanol, n-butanol, 2-butanol, isobutanol, n-pentanol, 2-pentanol, n-hexanol, n-octanol, cyclohexanol, 1,2-hexanediol, glycerine, sucrose, glucose, poly(vinylalcohol), polyethers having one or more hydroxyl groups (particularly homopolymers or copolymer of propylene oxide or butylene oxide, which have a secondary hydroxyl group), and the like. Aliphatic alcohols, for purposes of this invention, are compounds in which the hydroxyl group(s) are bonded directly to non-aromatic carbon atoms. Preferred alcohols have secondary or tertiary alcohol groups. Most preferred alcohols are those that have secondary alcohol groups. Some preferred alcohols have from 1 to 8 carbon atoms. An especially preferred alcohol is isopropanol.

When the desired amount of bromination has been achieved, a crude reaction mixture has formed. The crude reaction mixture contains the brominated butadiene polymer, the solvent and various reaction by-products and residues. The brominated butadiene polymer is typically wholly or partially dissolved in the solvent. The physical form of the crude reaction mixture therefore is a solution or slurry of the butadiene polymer in the solvent. If the crude reaction mixture is a slurry, the polymer particles will contain significant amounts of captured solvent. Often, a portion of the brominated butadiene polymer is dissolved in the solvent, and another portion has formed solvent-laden particles. The reaction by-products in the crude reaction mixture usually include HBr, especially when elemental bromine is used as the brominating agent. In the preferred bromination process, the crude reaction mixture also contains an aliphatic alcohol as described above.

A portion of the solvent is distilled from the crude reaction mixture. An advantage of the invention is that the reaction does not need to be quenched through the addition of a reducing agent such as an alkali metal bisulfite salt. Therefore, costs associated with addition of the reducing agent and its subsequent removal from the process can be avoided.

The distillation step can be done at atmospheric or subatmospheric pressures, and is performed at a temperature high enough to effect the distillation of solvent under the particular pressure conditions. At atmospheric pressure, this temperature is at least the boiling temperature of the solvent, or, if the solvent forms an azeotrope with any aliphatic alcohol that may be present, the boiling temperature of the azeotrope. Reduced pressures will reduce the necessary temperature.

Not all of the solvent is removed in this distillation step. If too much of the solvent is removed, the brominated butadiene polymer can precipitate to form large masses, which must then be broken down into smaller particles for subsequent processing. Therefore, enough solvent is left with the brominated polymer that the distillation residues in the form of a solution or slurry of the brominated polymer in the remaining solvent. The resulting solution or slurry may contain at least 30%, preferably at least 35% and more preferably at least 40% of the original quantity of the solvent. It may contain as much as to 90%, as much as 85%, or as much as 80% of the original quantity of the solvent. Conversely, at least 10%, preferably at least 15% and still more preferably at least 20% of the original quantity of solvent may be removed in the distillation step. Up to 70%, preferably up to 65% and more preferably up to 60% of the original quantity of solvent may be removed in the distillation step. The solvent may constitute at least about 35 weight percent, preferably at least about 50 weight percent, and more preferably at least about 65 weight percent of the resulting solution or slurry. It may constitute up to 95 weight percent, preferably up to 85 weight percent and more preferably to 80 weight percent of the resulting solution or slurry. The brominated butadiene polymer will mainly constitute the rest of the resulting solution or slurry.

A portion of the by-products and reaction residues are removed with the distilled solvent, especially in the preferred process in which the bromination has been conducted using elemental bromine in the presence of an aliphatic alcohol. The removal of by-products and reaction residues has been seen to produce a distinct color change in the distillation residues. As solvent is removed, the distillation residues become progressively lighter in color until much of the characteristic orange color of the reaction solution is gone. The aliphatic alcohol also tends to distill together with the solvent.

The distillate is condensed. The condensed distillate typically phase separates into a nearly colorless solvent layer and a colored, higher density layer which is usually of smaller volume than the solvent layer. The solvent layer is usually purified enough as a result of the phase separation that it can be recycled into the bromination reaction without further treatment. It is easily separated from the higher density layer by decantation, centrifugation, or other liquid-liquid separation processes.

The colored, higher density layer contains reaction by-products and residues. HBr that is generated in the bromination reaction mainly partitions into this layer. If an aliphatic alcohol is present in the reaction mixture, some or all of it is transferred into this higher density layer.

The colored, higher density layer usually represents a small volume stream, in comparison to the volumes of the solvent layer and the distillation residues. The volume of this layer is in many cases small enough that it can be disposed of without attempting to purify it or to recover the aliphatic alcohol for recycle. However, it is within the scope of the invention to purify this stream or recover one or more components thereof.

The brominated butadiene polymer can be recovered in several ways. Among these recovery approaches are (1) precipitation by contact with an antisolvent, (2) thermally stripping the remaining solvent, (3) a combination of both (1) and (2), or (4) a combination of (1), (2) or (3) with a washing step.

Recovery approach (1) is conveniently performed by contacting an antisolvent with the concentrated solution or slurry of the brominated butadiene polymer. The concentration solution or slurry is preferably dispersed into droplets prior to or simultaneously with the addition of the antisolvent, so that the polymer precipitates in the form of a particulate solid. The antisolvent also tends to perform a washing function, removing in that manner impurities that are soluble in the antisolvent. The precipitated polymer can be dried or otherwise separated from the antisolvent.

The antisolvent is a material that (1) is liquid at the operating temperatures and pressures, (2) is immiscible with the solvent present in the crude reaction mixture, (3) is not a solvent for the brominated butadiene polymer and (4) is less volatile than the solvent present in the concentrated solution or slurry of the brominated butadiene polymer. For purposes of this invention, an antisolvent is considered to be a "liquid at the operating temperatures and pressures" if its boiling temperature at the pressure used in the process is at or below the operating temperature. The solvent is considered to be immiscible in the antisolvent if it is not soluble at all in the antisolvent, or if it is soluble to the extent of 5 weight percent (5 parts solvent per 100 parts fluid medium), preferably 1 weight percent or less. Similarly, the antisolvent is considered for purposes of this invention not to be a solvent for the brominated polybutadiene polymer if the brominated polybutadiene polymer is not soluble at all in the antisolvent, or if it soluble to the extent of 5 weight percent (5 parts solvent per 100 parts fluid medium) or less. The brominated polybutadiene preferably is soluble to the extent of no more than 0.5 weight percent in the antisolvent. The antisolvent may be an organic liquid, but by far the most preferred antisolvent is water.

Because many of the impurities are removed in the distillation step, the antisolvent often does not become as highly contaminated, as is the case when the distillation step is not performed. Because the antisolvent is cleaner, there is less need to treat it before recycling the antisolvent back into the process. Antisolvent treatment steps therefore can be reduced or eliminated, which can lead to significant process economies.

Recovery approach (2) is conveniently performed by dispersing the concentrated solution or slurry of the brominated butadiene polymer to form droplets, which are heated to a temperature sufficient to drive off most or all of the remaining solvent. This can be done by dispersing the droplets into a gas, and heating the droplets to volatilize most or all of the remaining solvent from them. The temperature used to drive off the solvent is at least the boiling temperature (at the particular pressure conditions used during this step) of the solvent. It is preferred, but not necessary, that the temperature is below the glass transition temperature ($T_g$) of the neat brominated butadiene polymer, in order to prevent the resulting polymer particles from sticking together. The needed heat can be supplied by heating the gaseous medium, by heating the crude reaction solution prior to forming the droplets, or by heating the droplets. A preferred way of heating the droplets in this embodiment is to use a hot gas to heat and atomize the crude reaction fluid. The hot gas is preferably used as a second fluid in a two-fluid nozzle. If it is desired to evaporate more solvent from the droplets than the thermal energy of the atomizing gas can supply, additional hot gas can be supplied around the nozzle tip to from a shroud of additional hot gas. If necessary, the resulting particles are cooled to below the glass transition temperature of the neat brominated butadiene polymer before collecting them.

The third recovery approach is a combination of approaches (1) and (2). In one variation, the concentrated solution or slurry of the brominated butadiene polymer is dispersed into the antisolvent in the form of droplets, and the dispersed droplets are heated to drive off residual solvent. The dispersion is subjected to shearing conditions in order to keep the droplets dispersed until the remaining solvent is removed. The necessary heat can be provided by heating the entire dispersion to the necessary temperature, or by providing only localized heating at or near the location of the droplets in order to heat them to the needed temperature without heating the entire dispersion.

In the second variation of approach (3), droplets of the concentrated solution or slurry of the brominated butadiene polymer are dispersed in a gaseous medium as described before, and solvent is thermally removed from the droplets while they are in the gaseous medium. The polymer precipitates to form particles as the solvent is removed, and the polymer particles are dispersed in an antisolvent to complete the precipitation process and remove residual solvent if needed. In this variation, it is not necessary to apply heat to the particles once they are dispersed in the antisolvent, but it is within the scope of the invention to do so.

If necessary or desired, a washing step can be used in conjunction with any of approaches (1), (2) or (3). As noted, some washing occurs when the brominated butadiene polymer is contacted with an antisolvent, and in such case, it may not be necessary to add another washing step into the process. The washing step is performed by dispersing the particles of the brominated butadiene polymer into an antisolvent as described before, and then separating the washed particles from the antisolvent. The temperature is preferably below the glass transition temperature of the neat brominated butadiene polymer, in order to prevent the particles from sticking together to form large masses.

Enough of the solvent is removed during the recovery process to cause the butadiene polymer to precipitate. Preferably enough solvent is removed such that the polymer particles contain no more than 5%, more preferably no more than 1% and even more preferably no more than 0.25% by weight of solvent.

The process of the invention tends to produce brominated butadiene polymers that are highly purified. The high purity of the product is sometimes reflected in its thermal stability. A useful indicator of thermal stability is a 5% weight loss temperature, which is measured by thermogravimetric analysis as follows: 10 milligrams of the polymer is analyzed using a TA Instruments model Hi-Res TGA 2950 device, with a 60 milliliters per minute (ml/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its initial weight is designated the 5% weight loss temperature (5% WLT). This method provides a temperature at which a sample undergoes a cumulative weight loss of 5 wt %, based on initial or starting sample weight. The brominated butadiene polymer preferably exhibits a 5% WLT of at least 200° C. The 5% WLT is preferably at least 220° C., more preferably at least 230° C., even more preferably at least 240° C., and still more preferably at least 250° C. Brominated butadiene polymers in which at least 85% of the butadiene units have been brominated, and which have such 5% WLT values, are of particular interest. The 5% WLT should be no greater than 350° C., preferably no greater than 320° C.

The brominated butadiene polymer is useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated butadiene polymer is soluble or can be dispersed to form domains of less than 10 micrometers (μm), preferably less than 5 μm, in size. Enough of the brominated butadiene polymer is preferably present in the blend to provide the blend with a bromine content within a range of from 0.1 percent by weight to 25 percent by weight, based upon blend weight.

Blends of the brominated butadiene polymer may include other additives such as flame retardant additives, flame retardant adjuvants, thermal stabilizers, ultraviolet light stabilizers, nucleating agents, antioxidants, foaming agents, acid scavengers and coloring agents.

The following examples are provided to illustrate the invention, but not to limit the scope thereof. All parts and percentages are by weight unless otherwise indicated.

EXAMPLE 1

To a 1-L round bottom flask equipped with a thermowell, overhead stirrer with a stir paddle, addition funnel, condenser, Dean-Stark trap, and nitrogen inlet are added a poly(styrene/butadiene) tri-block co-polymer containing 60% polybutadiene (18.0 g, equivalent 0.2 mol polybutadiene), cyclohexane (358 g), and 2-propanol (12.5 g). The cyclohexane added also is used to fill the Dean-Stark trap. After the polymer has dissolved, the solution is heated to 70° C. using a heating mantle. Bromine (34.0 g, 0.105 mol) in cyclohexane (67.4 g)

is added dropwise via an addition funnel over 29 minutes, keeping the pot temperature between 65-74° C. After the bromine addition is complete, the Dean-Stark trap is drained, using the liquid to wash the addition funnel. The funnel is rinsed with additional cyclohexane (17.6 g), adding the rinses to the pot. Heating is continued, collecting distillate in the Dean-Stark trap. The trap is emptied at intervals, collecting distillate (126.6 g) over roughly 1 hour. During this time, the reaction mixture lightens in color, becoming an opaque off-white to light peach mixture. The distillate contains a large, colorless upper liquid layer and a much smaller lower yellow oily layer. Heating is discontinued and the pot mixture is cooled in a water bath to 30° C. Methanol (1403.6 g) is added to a 3-L round bottom flask equipped with an overhead stirrer with a stir paddle and nitrogen inlet. The cooled reaction mixture is poured into the stirring methanol over about 1 minute. The resulting slurry is filtered through a coarse glass-fritted funnel, washing the solids with methanol (193 g). The solids are dried overnight under ambient conditions to give dry, brominated polymer (44.5 g, 89% of the calculated weight of 100% brominated material) that by proton NMR is estimated to contain 2% of unreacted double bonds. The 5% weight loss temperature for this product, having an estimated bulk density of 0.43 g/mL, is 229° C.

What is claimed is:

1. A process comprising
   a) brominating a butadiene polymer to form a crude reaction mixture containing a brominated butadiene polymer dissolved or dispersed in a solvent;
   b) distilling a portion of the solvent from the crude reaction mixture to form (1) a distillate containing a portion of the solvent and (2) a concentrated solution or slurry of the brominated butadiene polymer in another portion of the solvent, such that from about 20 to 70% of the solvent is removed from the crude reaction mixture to produce a concentrated solution or slurry that contains from 65 to 80 percent by weight of the solvent, and then
   c) recovering the brominated butadiene polymer from the concentrated solution or slurry by (1) precipitating the brominated butadiene polymer from the concentrated solution or slurry by contact with an antisolvent, (2) thermally stripping the remaining solvent from the concentrated solution or slurry by forming the concentrated solution or slurry into droplets and heating the droplets to a temperature sufficient to drive off most or all of the remaining solvent, (3) a combination of both (1) and (2), or (4) a combination of (1), (2) or (3) with a washing step.

2. The process of claim 1, wherein step a) is conducted by brominating the butadiene polymer with elemental bromine in the presence of the solvent and an aliphatic alcohol having a boiling temperature of up to 120° C.

3. The process of claim 2, wherein in step b), a distillate is formed and condensed, and the condensed distillate phase separates into a solvent layer and a layer that contains at least a portion of the aliphatic alcohol.

4. The process of claim 1, wherein the butadiene polymer is a copolymer of butadiene and a vinyl aromatic polymer.

5. The process of claim 4, wherein the copolymer is a block copolymer of butadiene and styrene.

6. The process of claim 1, wherein the butadiene polymer is a butadiene homopolymer.

7. The process of claim 1, wherein the brominated polybutadiene polymer is recovered in the form of particles having a bulk density of at least 0.20 g/mL.

8. The process of claim 1, wherein the brominated polybutadiene polymer is recovered in the form of particles having a bulk density of at least 0.35 g/mL.

9. The process of claim 1, wherein the brominated polybutadiene polymer is recovered in the form of particles having a bulk density of 0.40-0.45 g/mL.

* * * * *